(12) United States Patent
Gannon et al.

(10) Patent No.: US 8,245,479 B2
(45) Date of Patent: Aug. 21, 2012

(54) HINGE CONNECTOR FOR CONNECTING STRUCTURAL FRAME MEMBERS

(75) Inventors: Gary N. Gannon, St. Louis, MO (US); David C. Wert, Pacific, MO (US); Melvin E. Mittendorf, Maryland Heights, MO (US); Robert A. LePoire, St. Albans, MO (US)

(73) Assignee: Mitek Holdings, Inc., Wilmington, DE (US)

( * ) Notice: Subject to any disclaimer, the term of this patent is extended or adjusted under 35 U.S.C. 154(b) by 235 days.

(21) Appl. No.: 12/430,721

(22) Filed: Apr. 27, 2009

(65) Prior Publication Data

US 2010/0269445 A1 Oct. 28, 2010

(51) Int. Cl.
E04B 1/32 (2006.01)
E04B 7/16 (2006.01)
F16B 15/06 (2006.01)
(52) U.S. Cl. ............................................ 52/641; 52/713
(58) Field of Classification Search ............ 52/641, 52/645, 696, 712, 713, DIG. 6; 403/13, 119, 403/163; 16/360, 384, 391
See application file for complete search history.

(56) References Cited

U.S. PATENT DOCUMENTS

| | | | |
|---|---|---|---|
| 506,006 A * | 10/1893 | Kreider | 403/161 |
| 2,827,676 A | 3/1958 | Sanford | |
| 2,937,418 A | 5/1960 | Sanford | |
| 3,312,485 A | 4/1967 | Koenigshof | |
| 3,479,783 A | 11/1969 | Jureit | |
| 3,605,355 A | 9/1971 | Solesbee | |
| 3,760,550 A | 9/1973 | Mueller | |
| 3,785,108 A * | 1/1974 | Satchell | 52/645 |
| 3,823,522 A | 7/1974 | Jureit | |
| 4,295,318 A | 10/1981 | Perlman | |
| RE31,234 E | 5/1983 | Jureit | |
| 4,381,635 A | 5/1983 | Solo | |
| 4,483,120 A | 11/1984 | Gottlieb | |
| 4,486,115 A | 12/1984 | Rionda | |
| 4,527,933 A * | 7/1985 | Karhumaki et al. | 411/463 |
| 4,538,393 A | 9/1985 | Mitchell | |
| 4,549,838 A | 10/1985 | Birckhead | |
| 5,094,059 A | 3/1992 | Ganescu | |
| 5,553,961 A * | 9/1996 | Olden | 403/119 |
| 5,725,279 A * | 3/1998 | Ward et al. | 297/378.1 |
| 5,846,018 A * | 12/1998 | Frobosilo et al. | 403/403 |
| 5,966,892 A | 10/1999 | Platt | |
| 6,324,810 B1 * | 12/2001 | Thompson | 52/713 |
| 6,401,422 B1 | 6/2002 | Olden | |
| 6,711,780 B2 * | 3/2004 | Lee | 16/326 |
| 6,971,623 B2 * | 12/2005 | Allmon et al. | 248/680 |

* cited by examiner

*Primary Examiner* — Christine T Cajilig

(74) *Attorney, Agent, or Firm* — Senniger Powers LLP

(57) ABSTRACT

A hinged connector for use in pivotally connecting structural components has improved robustness to carry greater loads through a hinged joint formed using the hinged connector. In one aspect ribs are formed in the hinged connector adjacent the pivoting location. Parts are shaped and arranged to resist tearing in tension and buckling in compression.

20 Claims, 10 Drawing Sheets ial members so that
the structural member pivots conjointly with the sheet metal
plate. Locator tabs struck from the first sheet metal plate and
extending outwardly from the inner surface of the first sheet
metal plate are for positioning the truss members relative to
each other. Slots formed in the first sheet metal plate by
striking the locator tabs from the plate have first and second
ends. Each locator tab is disposed at the first end of a respective one of the slots. The locator tab and first end of the slot
being nearer to the opening in the first sheet metal plate than
the second end of the slot.

In yet another aspect of the present invention, a truss
adapted to collapse for transport and to be erected at a building site generally comprises interconnected truss members
including first and second truss members pivotally connected
to other of the truss members for pivoting movement of the
truss members between a collapsed position in which the
truss is compacted for transportation and an erect position in
which the truss is expanded for installation into a structure.
The truss further includes a hinged connector substantially as
set forth in the first paragraph of this Summary.

HINGE CONNECTOR FOR CONNECTING STRUCTURAL FRAME MEMBERS

FIELD OF THE INVENTION

The present invention generally relates to a hinged connector and a truss including such a hinge connector.

BACKGROUND

The use of roof trusses manufactured in a truss plant and shipped to a building site for installation in a structure is commonplace. Because some trusses are too large for transport over public streets and highways, truss manufacturers add hinged connections within the truss so that the truss can be collapsed to a smaller (typically shorter) size for shipping. To assemble such a truss, the truss manufacturer positions truss members and nailing plates for proper engagement with one another. Integral teeth on the nailing plates, including some nailing plates having a hinge, are pressed into the truss members by a press, such as conventionally used for the driving of nailing plates to form the truss. Examples of hinged connectors used in collapsible truss manufacture are shown in co-assigned U.S. Pat. Nos. 5,553,961 and 6,401,422, the disclosures of which are incorporated herein by reference. The manufacturers then collapse the truss structure at the hinged joints for transport to the building site.

There is a substantial demand for trusses that are of larger and more complex shapes as well as trusses that must carry load across larger spans, such as attic frame roof trusses. These trusses can require larger pieces of wood and place larger loads on any connection including hinged connections.

SUMMARY

In one aspect of the present invention, a hinged connector for connecting wooden structural members for pivotal movement of one of the members relative to the other generally comprises a first sheet metal plate and a second sheet metal plate pivotally attached to the first sheet metal plate. Each of the sheet metal plates includes a body portion, an extension portion extending from the body portion and generally overlapping the extension portion of the other sheet metal plate, an inner surface and an outer surface. The plates are pivotable with respect to each other about an axis generally perpendicular to the inner and outer surfaces. Connection formations on each of the first and second sheet metal plates are for attaching the plate to a respective one of the structural members so that the structural member pivots conjointly with the sheet metal plate. A rib is formed into the first sheet metal plate, and at least a portion of the rib is disposed in the extension portion of the first sheet metal plate.

In another aspect of the present invention a hinged connector for connecting wooden structural members for pivotal movement of one of the members relative to the other generally comprises a first generally rectangular sheet metal plate and a second generally rectangular sheet metal plate pivotally attached to the first sheet metal plate by way of an opening in the extension portion of the first sheet metal plate. Each of the sheet metal plates includes a body portion, an extension portion extending from the body portion and generally overlapping the extension portion of the other sheet metal plate, an inner surface and an outer surface. The plates are pivotable with respect to each other about an axis generally perpendicular to the inner and outer surfaces and extending generally through the center of the opening. Connection formations on each of the first and second sheet metal plates are for attaching

BRIEF DESCRIPTION OF THE DRAWINGS

Corresponding reference characters indicate corresponding parts throughout the drawings.

DETAILED DESCRIPTION OF THE DRAWINGS

Figure 7:
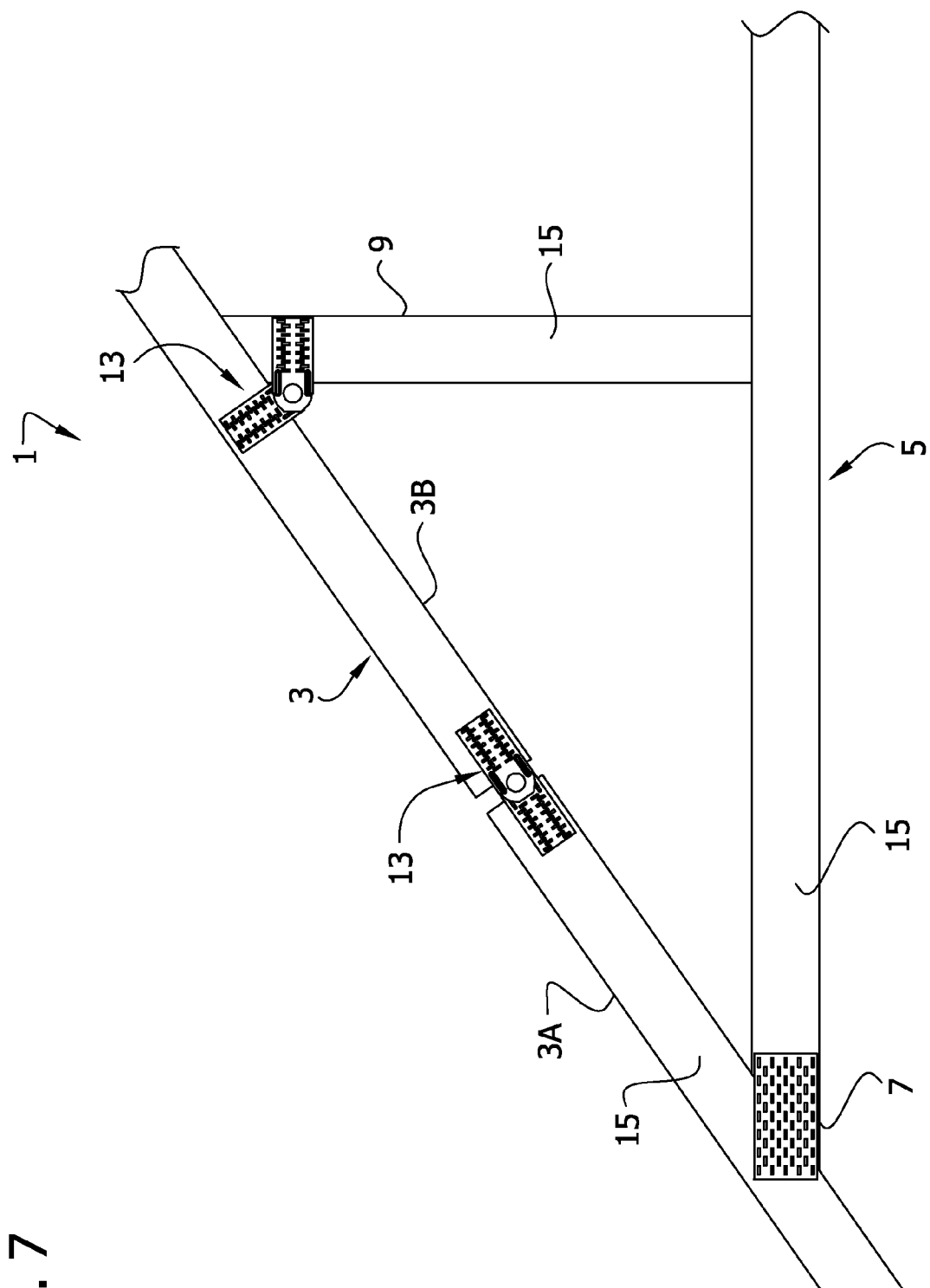
FIG. 7 is a fragmentary elevation of a roof truss including hinged connectors.
Figure 8:
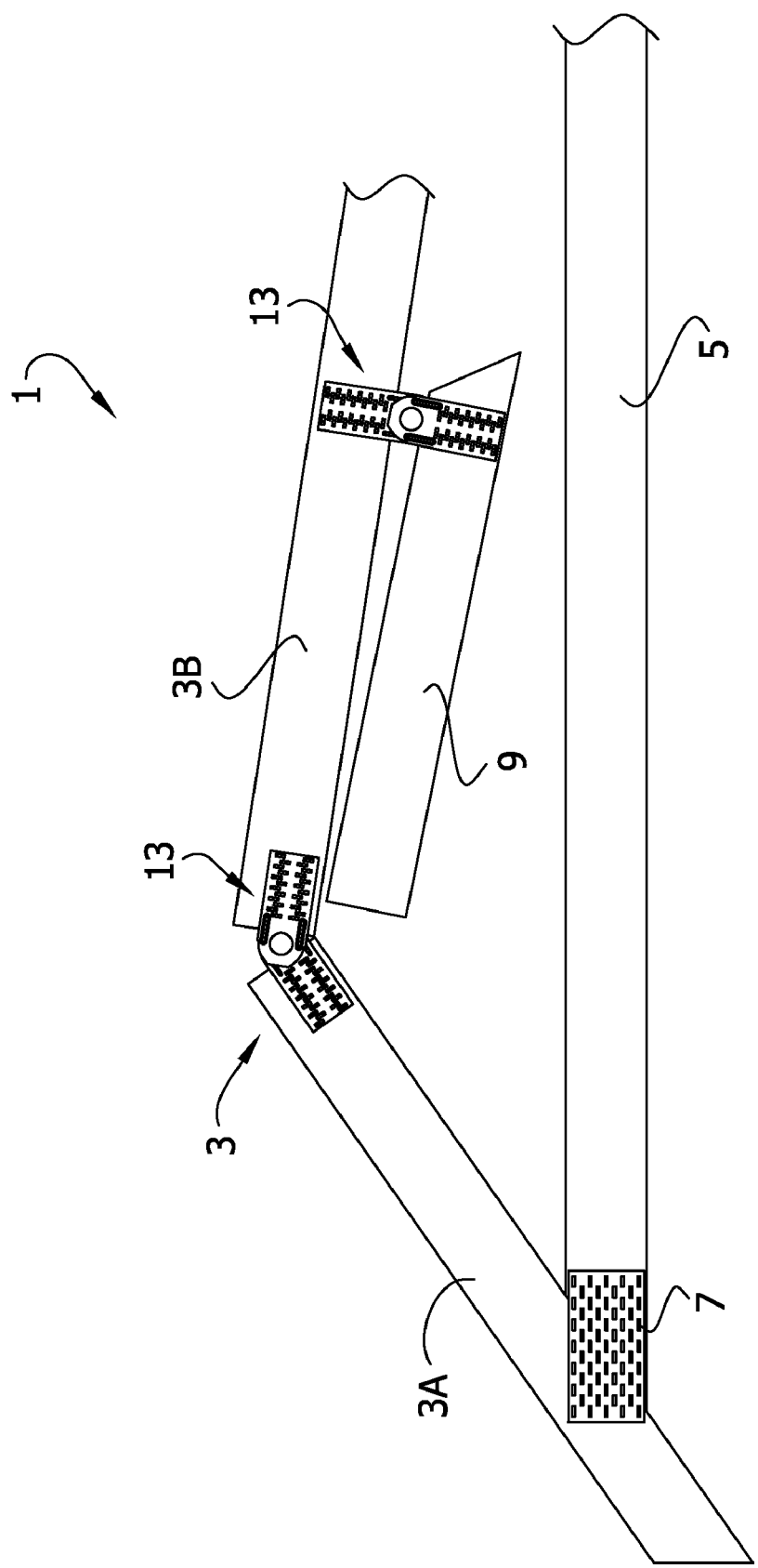
FIG. 8 is the roof truss of FIG. 7 in a collapsed condition.

Referring now to the drawings and in particular to FIGS. 7 and 8, a fragmentary portion of a roof truss is designated generally at 1. Conventionally, multiple, parallel wood roof trusses are used in a roof to provide structural support for the roof. The truss 1 shown is a simple roof truss formed of truss members (broadly, wooden structural members") including a left upper chord 3 and a right upper chord (not shown) angled upwardly and inwardly meeting at a peak (not shown). A lower chord 5 joins the lower ends of the upper chords. As illustrated in FIG. 7, the left chord 3 is attached to the lower chord 5 by a connector plate 7. The truss members further include a web member 9 extending between the lower chord 5 and the left upper chord 3, and also between the lower chord and the right upper chord though not illustrated. The number and orientations of the web members may vary from the illustrated embodiment without departing from the scope of the invention, as a hinged connector of a first embodiment of the present invention, generally indicated at 13, is readily applicable to other truss designs. For example, the truss members may include some metal chords or webs (not shown).

Moreover, the hinge connectors 13 may be used in a structural support other than a roof truss.

For the purposes of this description, each piece of lumber incorporated as a truss member is of rectangular cross section having two narrow sides and two wide sides. The lumber surfaces incorporating the two wide sides of the truss members will be called faces. Collectively, the members of the truss of FIG. 7 each have a first face 15 and an opposite second face, corresponding to the wide sides of the member. Only the first faces 15 can be seen in the drawings.

The left upper chord 3 includes a first upper chord element 3A and a second upper chord element 3B that are connected together by one pair of the hinged connectors 13. Only one of the hinged connectors is illustrated, the other hinged connector 13 being located on the other faces of the first and second upper chord elements. Another hinged connector pair connects the second upper chord element 3B to the web member 9. Again, only one hinged connector 13 is shown, the other being located on the opposite faces of the second upper chord element and web member 9. The hinged connectors 13 allow the truss 1 to be collapsed as shown in FIG. 8. In the collapsed position, the second upper chord element 3B folds relative to the first upper chord element 3A by pivoting of the hinged connectors 13 down toward the lower chord 5. The web member 9 folds up against the second upper chord element 3B. Thus, the truss 1 has a lower height such as is suitable for over-the-road shipping. When the truss 1 is erected at the construction site, the second upper chord element 3B and the web member 9 are pivoted via the hinged connectors 13 to the position shown in FIG. 7. Connector plates or other suitable connectors (not shown) would be used to attach the lower end of the web member 9 to the lower chord 5 and to connect the upper left chord 3 to the upper right chord at the peak (not shown).

Figure 1:
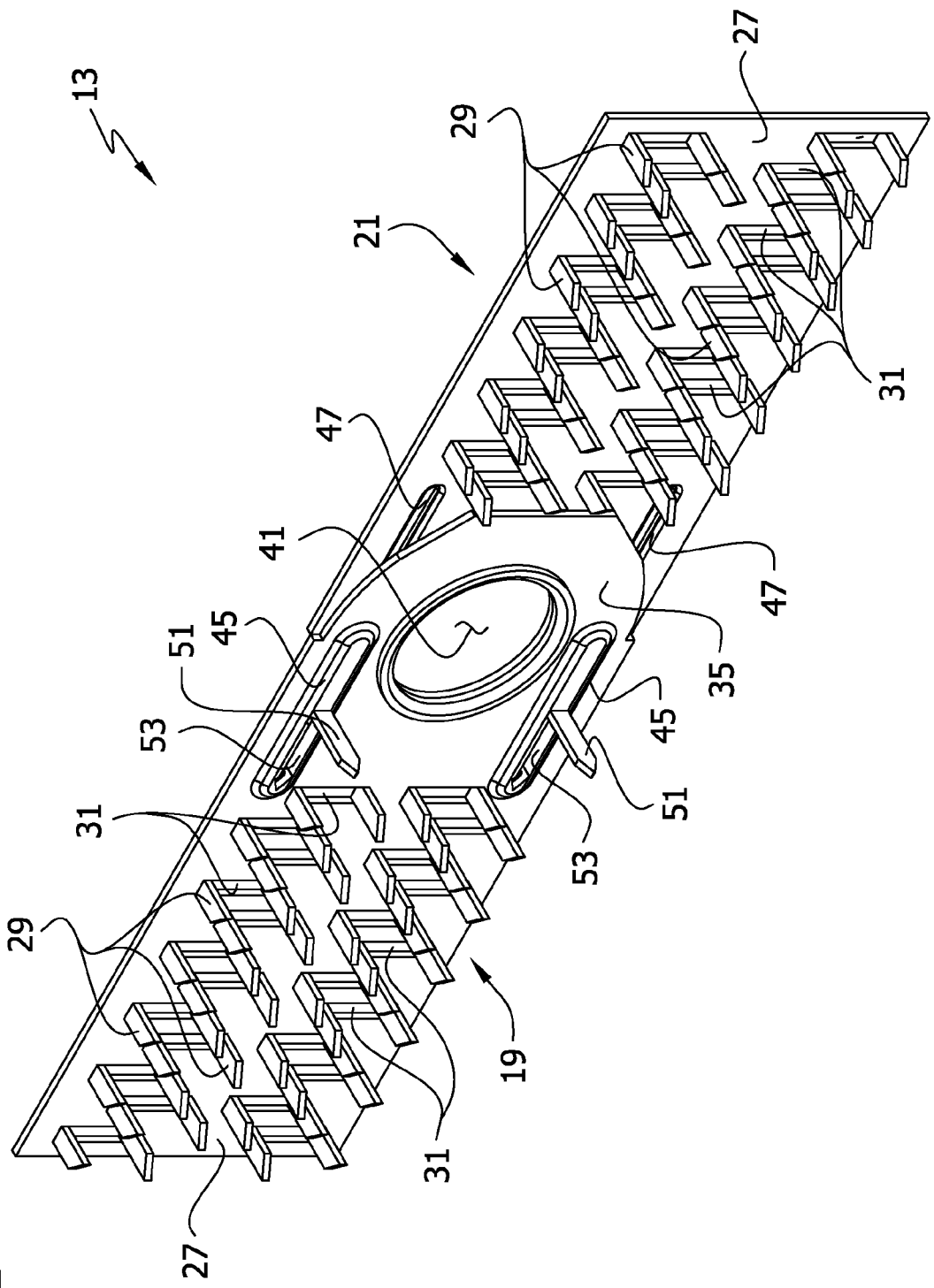
FIG. 1 is a perspective of a hinged connector of a first embodiment.
Figure 2:
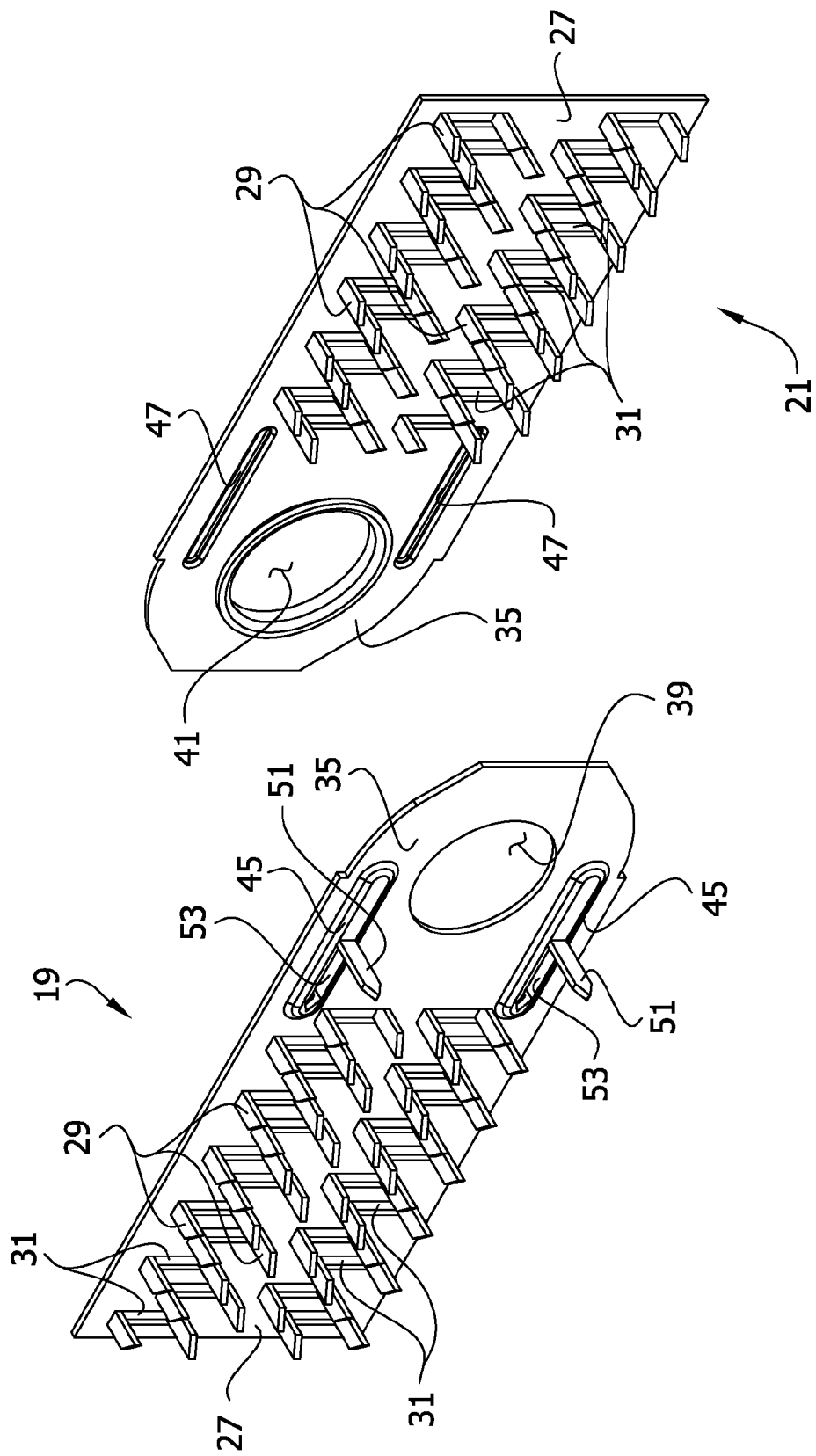
FIG. 2 is an exploded perspective thereof.
Figure 3:
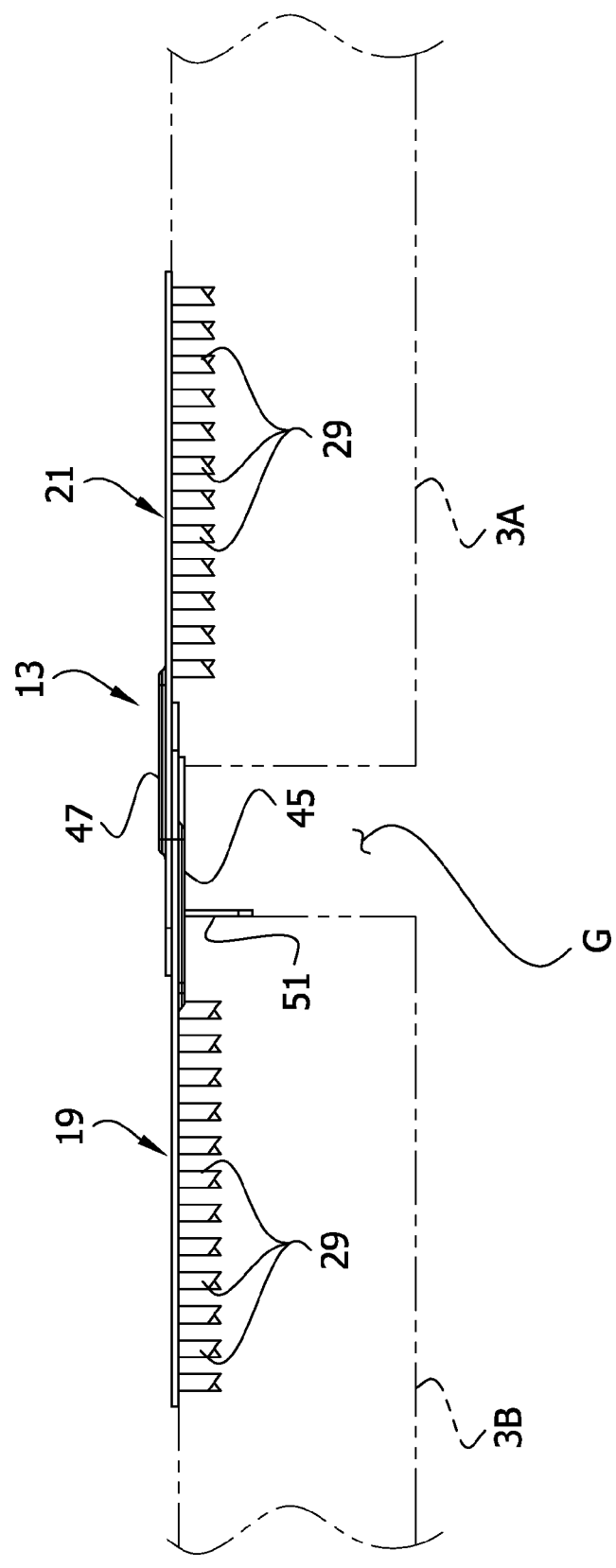
FIG. 3 is an edge elevation of the hinged connector with wooden structural components in which the hinged connector is embedded shown in phantom.
Figure 4:
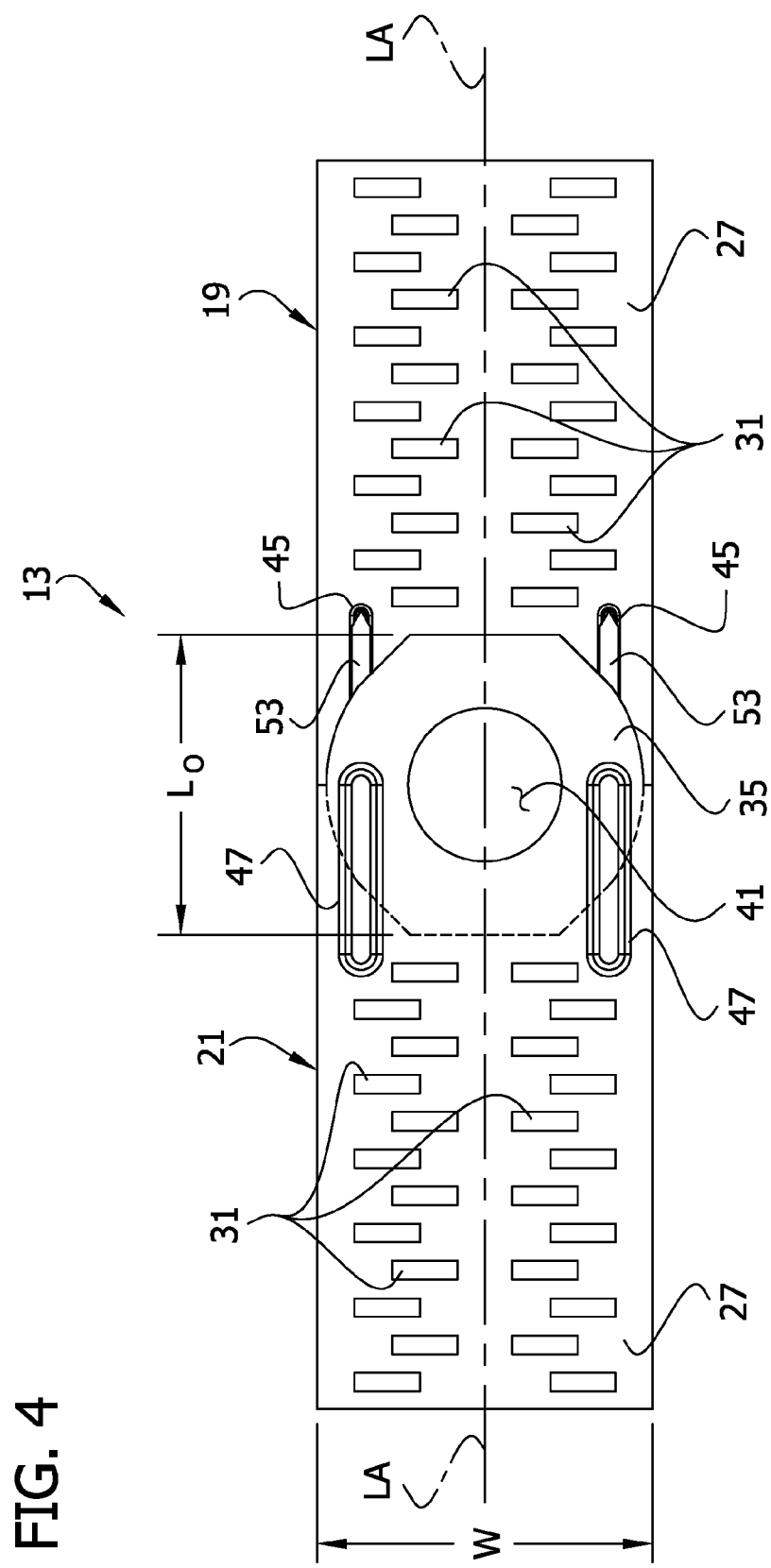
FIG. 4 is a plan view of the hinged connector showing outside surfaces of first and second connector elements of the hinged connector.
Figure 5:
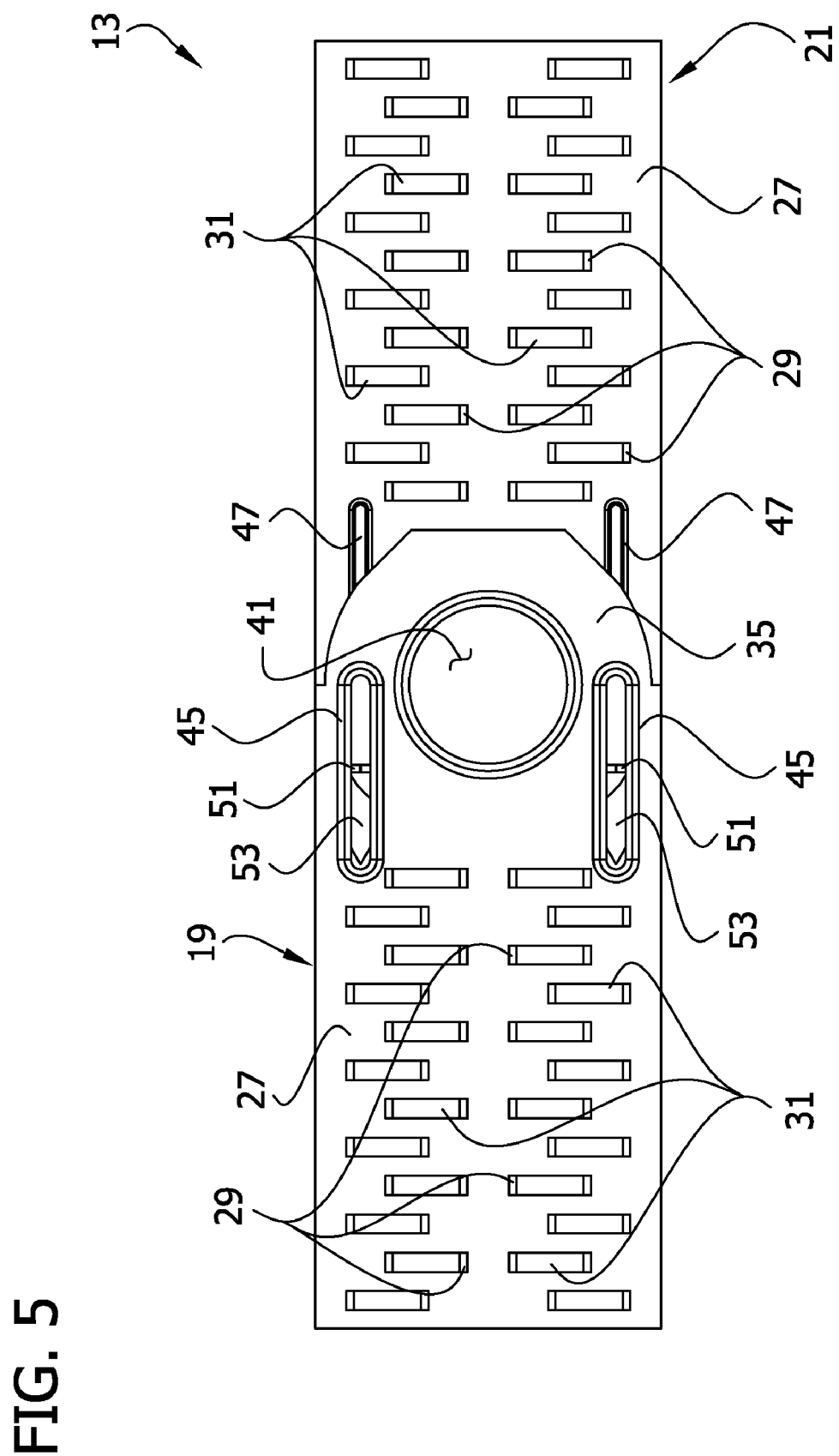
FIG. 5 is a plan view of the hinged connector showing inside surfaces of the first and second connector elements.

Referring now to FIGS. 1-5, the hinged connector 13 comprises a first sheet metal plate 19 and a second sheet metal plate 21 pivotally attached to the first sheet metal plate. The sheet metal plates 19, 21 are each elongate and generally rectangular in shape. For purposes of this description, the plates 19, 21 each have a longitudinal axis LA extending lengthwise of the plate generally along the centerline of the plate (see FIG. 4). Moreover, the first and second sheet metal plates 19, 21 each have lateral edges extending lengthwise of the plates and transverse edges at the ends of the plates. Near one end of each sheet metal plate 19, 21, the lateral edges have curved segments curving toward the longitudinal axis to their intersection with the transverse edge. Each of the sheet metal plates includes a body portion 27 in which teeth 29 are formed and extend from the inside surface of the sheet metal plate. Pairs of teeth 29 are formed by striking from the sheet metal plate 19, 21, leaving an opening 31 in the plate. The teeth 29 are disposed at each end of the opening 31. Extension portions 35 of the sheet metal plates 19, 21 extend from the body portions 27 and overlap each other where the sheet metal plates 19, 21 are pivotally joined together. The amount of overlap is defined for this description as the ratio of the length of overlap $L_O$ along the longitudinal axes LA of the first and second sheet metal plates 19, 21 when they are aligned as shown in FIGS. 4 and 5, to the width W of the sheet metal plates in the body portion. If the sheet metal plates have different widths, then the smaller width of the two sheet metal plates is used to calculate the overlap ratio. In the illustrated embodiment (see, FIG. 4), the overlap ratio is greater than about 0.75, more preferably at least about 0.85, and still more preferably at least about 0.89.

The pivotal connection between the first and second sheet metal plates 19, 21 can be substantially as in U.S. Pat. Nos. 5,553,961 and 6,401,422. More specifically, the first sheet metal plate 19 is formed with an opening 39 in the extension portion (see FIG. 6). The material of the second sheet metal plate 21 is formed through the opening 39 in the first sheet metal plate 19 and rolled over to capture the first sheet metal plate while permitting relative pivoting motion between the first and second sheet metal plates about an axis extending generally through the center of the opening. Forming the second sheet metal plate 21 in this manner leaves an opening 41 in the second sheet metal plate that is aligned and extends through the opening 39 in the first sheet metal plate 19. It will be understood that first and second sheet metal plates may be pivotally connected to each other in other ways without departing from the scope of the present invention.

The first and second sheet metal plates 19, 21 each are formed with two ribs that extend parallel to the longitudinal axis LA of the sheet metal plate near opposite lateral edges. The ribs of the first sheet metal plate 19 are designated by reference numeral 45 and the ribs of the second sheet metal plate are designated by reference numeral 47. The ribs 45, 47 are each formed as depressions in the respective sheet metal plate 19, 21, and in a way which will not interfere with pivoting movement of the first sheet metal plate 19 relative to the second sheet metal plate 21. The depressions on the first sheet metal plate 19 extend into the first sheet metal plate from the outer surface of the first sheet metal plate so that the ribs 45 protrude inward from the inner surface of the first sheet metal plate and away from the second sheet metal plate 21. The depressions on the second sheet metal plate 21 extend into the second sheet metal plate from the inner surface of the second sheet metal plate so that the ribs 47 protrude outward from the outer surface of the second sheet metal plate and away from the first sheet metal plate 19. The ribs 45, 47 are elongate and have roughly oval shapes. Each rib 45, 47 extends from a location on the body portion 27 of the sheet metal plate 19, 21 laterally adjacent to the last pairs of teeth 29 on the body portion onto the extension portion 35 approximately to a transverse line that passes through the centers of the openings in the first and second sheet metal plates 19, 21. It will be understood that ribs may have other shapes and arrangements within the scope of the present invention. For instance, first and second sheet metal plates may have different numbers and/or arrangements of ribs. Moreover, ribs may be formed by the addition of material to the sheet metal plate as opposed to the deformation of the material of the sheet metal plates.

Figure 6:
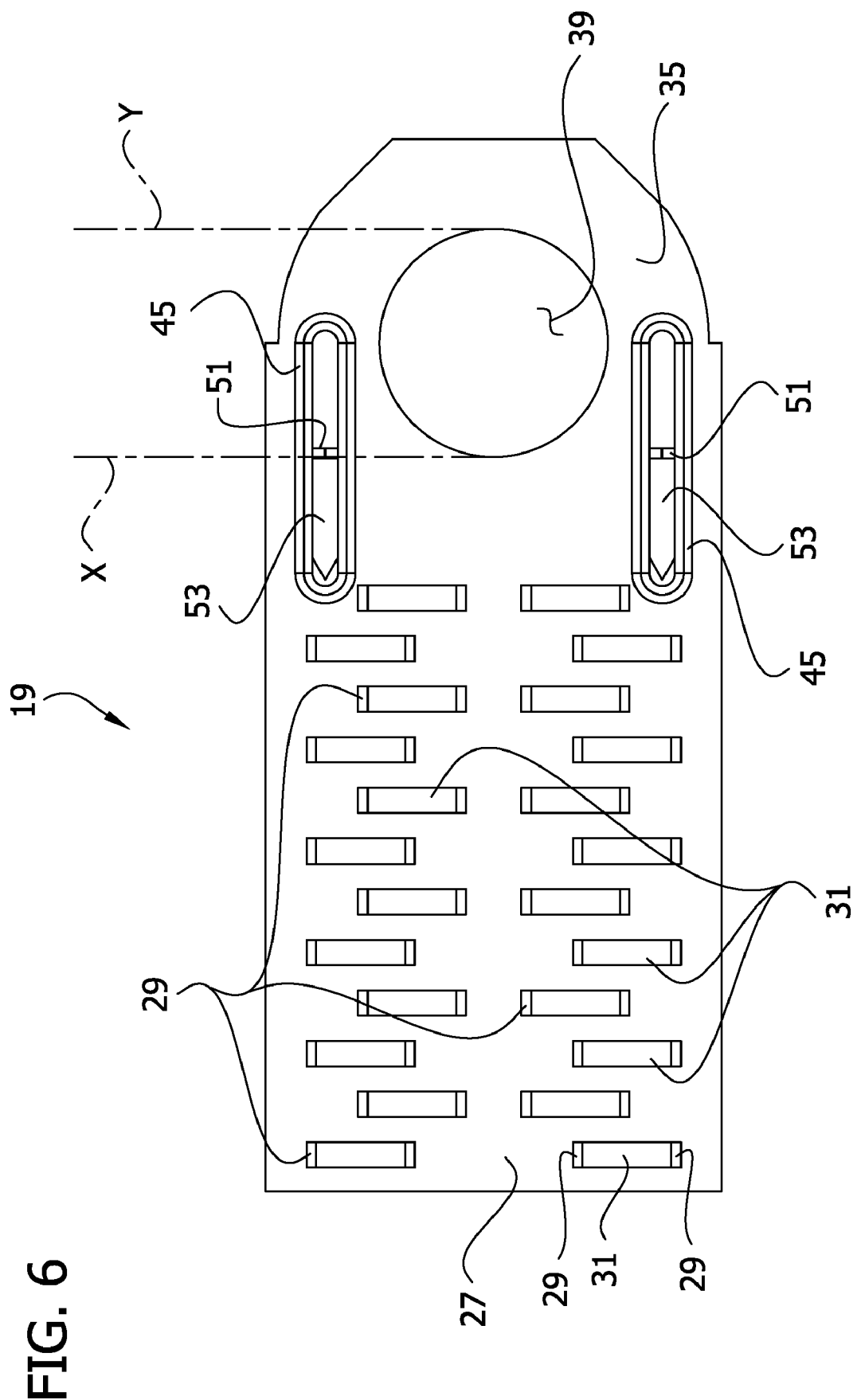
FIG. 6 is a plan view of the first connector element showing the inside surface thereof.

Locator tabs 51 are formed in the first sheet metal plate 19 to position the sheet metal plates on the truss members, such as the first upper chord element 3A and the second upper chord element 3B shown in FIG. 7. The purpose is essentially the same as for the fingers 89 described in co-assigned U.S. Pat. No. 5,553,961. The locator tabs 51 project inwardly from the inner surface of the first sheet metal plate 19 a distance greater than the teeth 29 so the locator tabs may engage the end of the first upper chord element 3A prior to the teeth being pressed into the upper chord elements. FIG. 3 illustrates the hinged connector 13 after the teeth 29 have been pressed into the first and second upper chord elements 3A, 3B, so that it may be seen how the locator tabs 51 engage the end of the upper chord element 3A. As illustrated, a 1 inch gap G is left between the adjacent ends of the first and second upper chord elements 3A, 3B. The gap G permits the first and second upper chord elements 3A, 3B to pivot about each other. Other ways of providing space for pivoting, such as beveling cutting one or both adjacent ends of the chord elements may be used within the scope of this In the illustrated embodiment, the locator tabs 51 are struck out of the ribs 45 formed on the first sheet metal plate 19 in a manner similar to the teeth 29. Formation of each locator tab 51 leaves a slot 53 extending along the length of the rib 45 parallel to the longitudinal axis LA and adjacent lateral edge of the first sheet metal plate 19. Each slot 53 has longitudinally opposite ends. The locator tab 51 is disposed at a first end of the slot 53 and a second end of the slot is located adjacent teeth 29 on the body portion 27 of the first sheet metal plate 19. Thus the locator tab 51 is positioned nearest the transverse edge of the first sheet metal plate 19 including the extension portion 35 and the slot 53 extends away from the locator tab toward the transverse edge of the first sheet metal plate including the body portion 27. As shown in FIG. 6, the locator tab slots 53 are out of lateral registration with the opening in the first sheet metal plate 19. Stated another way, the slots 53 do not lie in a region defined by lines X and Y tangent to the opening 39 in the plane of the first sheet metal plate 19 that are perpendicular to the longitudinal axis LA. Offsetting the slots from the opening 39 in the first sheet metal plate 19 improves tension strength.

Figure 9:
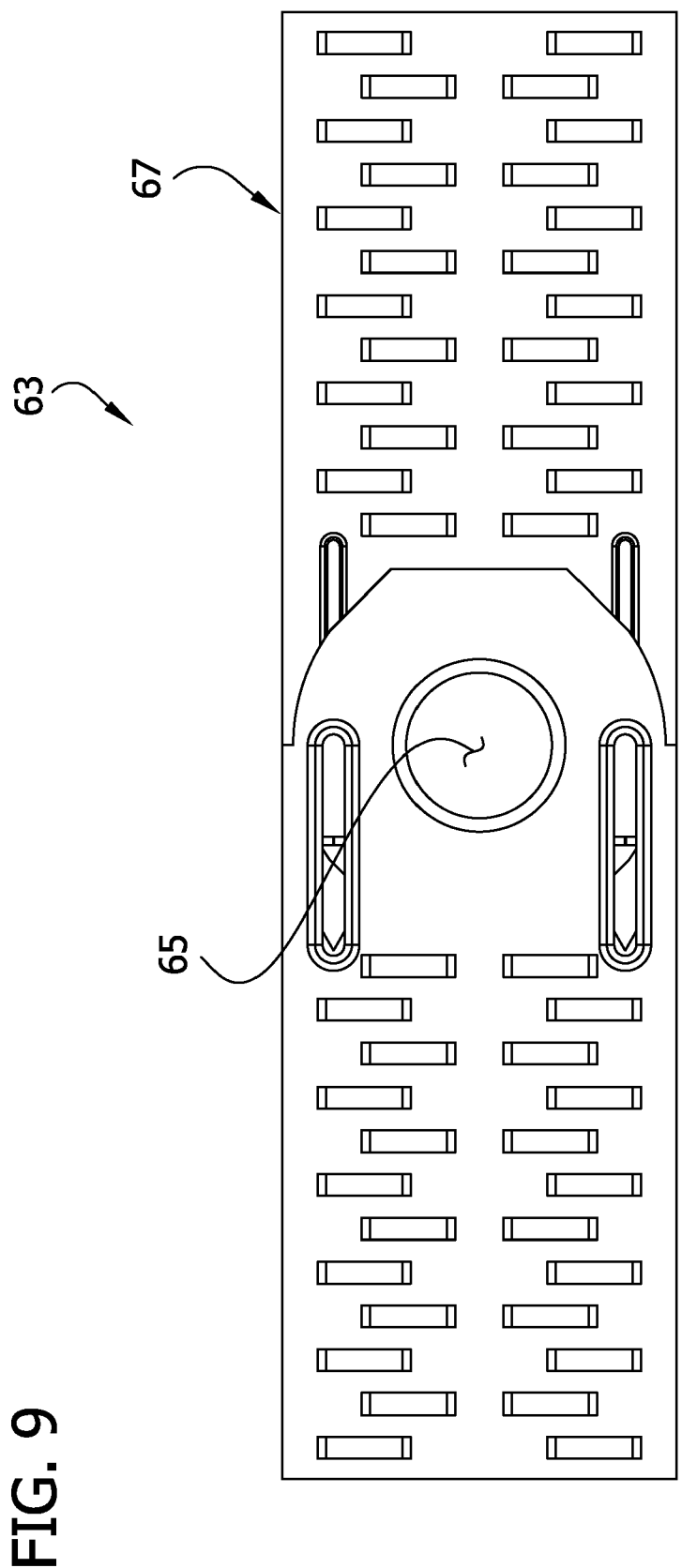
FIG. 9 is a hinged connector of a second embodiment.

Referring now to FIG. 9, a hinged connector 63 of a second embodiment is illustrated. The hinged connector 63 has substantially the same construction as the hinged connector 13 of the first embodiment, except the opening 65 in the hinged connector 63 (which is the same as the opening in a second sheet metal plate 67 of the hinged connector 63) is smaller than the opening 41 in the hinged connector 13 of the first embodiment. As an example, the opening 41 in the hinged connector 13 of the first embodiment is about 1.09 inches (2.77 cm) and the opening in the hinged connector 63 of the second embodiment is about 0.77 inches (1.96 cm).

Figure 10:
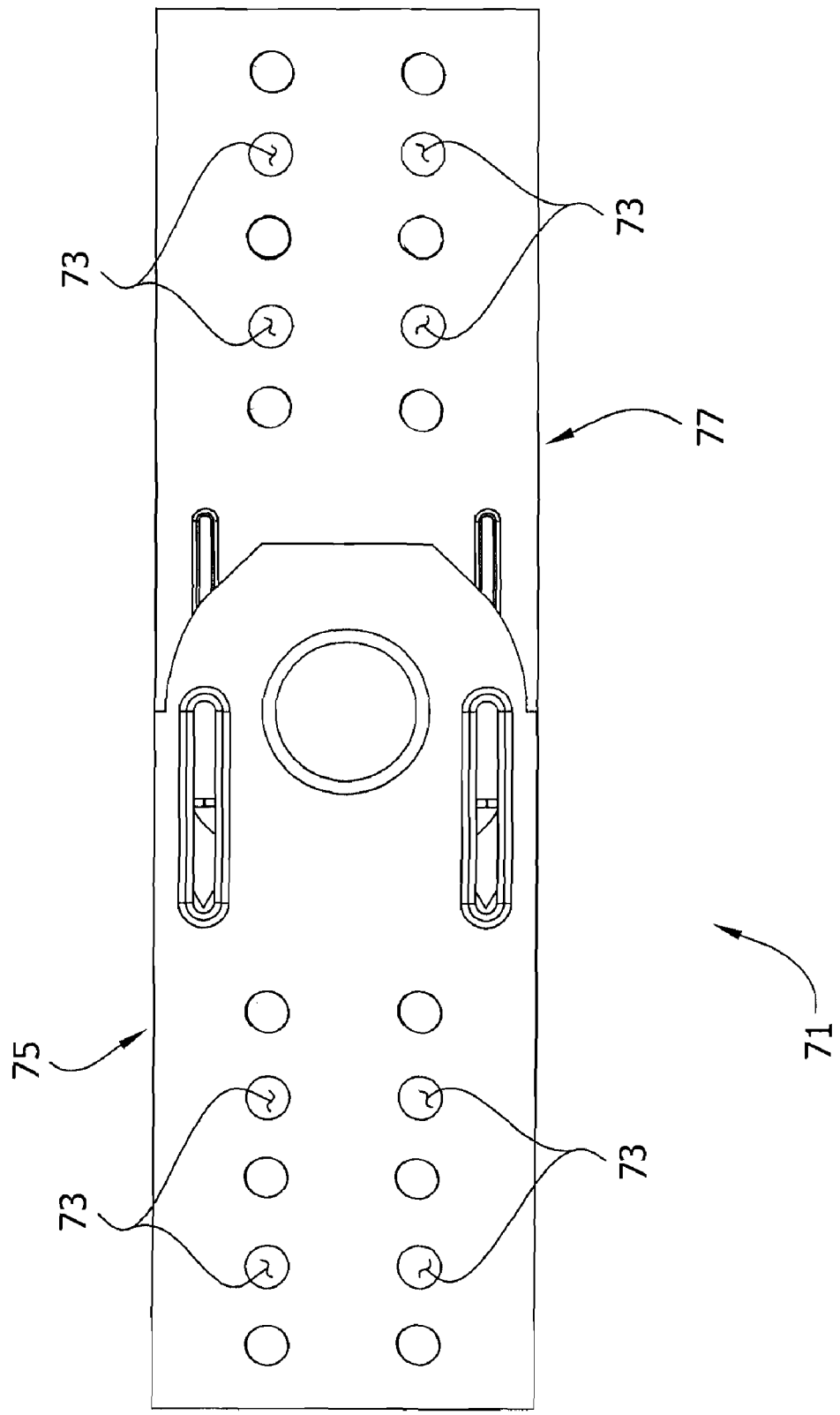
FIG. 10 is a hinged connector of a third embodiment.

A hinged connector of a third embodiment shown in FIG. 10 is designated generally by reference numeral 71. The hinged connector 71 of the third embodiment has substantially the same construction as the hinged connector 13 of the first embodiment, except that instead of teeth 29 struck from the first and second sheet metal plates 19, 21, openings 73 are provided in first and second sheet metal plates 75, 77. The openings 73 are capable of receiving screws (not shown) or other suitable connectors for securing the hinged connector 71 to a truss. The teeth 29 of the first embodiment and openings 73 of the third embodiment may both be broadly considered to be "connection formations" on the hinged connector 71. The connector 71 is particularly useful with trusses made from metal rather than wooden truss elements. Other variations (not shown) are possible, such as having teeth stamped into one sheet metal plate and openings on the other sheet metal plate, as shown in co-assigned U.S. Pat. No. 6,401,422.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description and shown in the accompanying drawings shall be interpreted as illustrative and not in a limiting sense.

What is claimed is:

1. A hinged connector for connecting wooden structural members for pivotal movement of one of the members relative to the other, the hinged connector comprising:
   a first sheet metal plate and a second sheet metal plate pivotally attached to the first sheet metal plate, each of the sheet metal plates including a body portion, an extension portion extending from and parallel to the body portion and generally overlapping the extension portion of the other sheet metal plate, an inner surface and an outer surface, the plates being pivotable with respect to each other about an axis generally perpendicular to the inner and outer surfaces;
   connection formations on each of the first and second sheet metal plates for attaching the plate to a respective one of the structural members so that the structural member pivots conjointly with the sheet metal plate, wherein the extension portions of the first and second sheet metal plates are free from connection formations;
   an elongate rib formed into the first sheet metal plate, the elongate rib having first and second terminal ends spaced apart from each other, at least a portion of the rib being disposed in the extension portion of the first sheet metal plate, wherein no portion of the rib extends around the connection formations on the first sheet metal plate; and
   an elongate rib formed into the second sheet metal plate, the elongate rib having first and second terminal ends spaced apart from each other, at least a portion of the rib in the second sheet metal plate being disposed in the extension portion of the second sheet metal plate, wherein the extension portion of the first sheet metal plate overlies at least a portion of the elongate rib in the second sheet metal plate.

2. A hinged connector as set forth in claim 1 wherein the elongate rib of the first sheet metal plate extends generally parallel to a lengthwise dimension of the first sheet metal plate.

3. A hinged connector as set forth in claim 2 wherein the elongate rib of the first sheet metal plate is formed as a depression in the first sheet metal plate extending away from the second sheet metal plate.

4. A hinged connector as set forth in claim 3 wherein the elongate rib on the first sheet metal plate constitutes a first rib and wherein the hinged connector further comprises a second rib formed in the first sheet metal plate.

5. A hinged connector as set forth in claim 4 wherein the second rib on the first sheet metal plate has substantially the same configuration as the first rib on the first sheet metal plate and is arranged in a spaced apart, generally parallel relation with the first rib.

6. A hinged connector as set forth in claim 1, wherein no portion of the elongate rib in the second sheet metal plate extends around the connection formations on the second sheet metal plate.

7. A hinged connector as set forth in claim 6 wherein the elongate ribs on the first and second sheet metal plates each constitute a first rib, the hinged connector further comprising a second rib formed in the first sheet metal plate and a second rib formed in the second sheet metal plate.

8. A hinged connector as set forth in 7 further comprising locator tabs struck from the first sheet metal plate, one of the locator tabs being formed in the first rib of the first sheet metal plate and another of the locator tabs being struck from the second rib on the first sheet metal plate, the locator tabs projecting outwardly from the inner surface of the first sheet metal plate.

9. A hinged connector as set forth in claim 1 further comprising a locator tab struck from the first sheet metal plate.

10. A hinged connector as set forth in claim 9 wherein the locator tab is struck out of the elongate rib on the first sheet metal plate.

11. A hinged connector as set forth in claim 10 further comprising an opening in the extension portion of the first sheet metal plate, the second sheet metal plate being pivotally attached to the first sheet metal plate by way of the opening.

12. A hinged connector as set forth in claim 11 further comprising a slot formed in the elongate rib in the first sheet metal plate by striking the locator tab from the elongate rib in the first sheet metal plate, the slot being completely out of lateral registration with the opening.

13. A hinged connector as set forth in claim 1 wherein the first and second sheet metal plates each having a longitudinal axis, and wherein an overlap ratio of a length along the longitudinal axes in which the sheet metal plates are overlapped to a width of the sheet metal plates in the body portion is at least about 0.75.

14. A hinged connector as set forth in claim 13 wherein the overlap ratio is at least about 0.89.

15. A hinged connector as set forth in claim 1 wherein the connection formations comprise at least one of teeth and openings.

16. A hinged connector for connecting wooden structural members for pivotal movement of one of the members relative to the other, the hinged connector comprising:
a first generally rectangular sheet metal plate and a second generally rectangular sheet metal plate pivotally attached to the first sheet metal plate, each of the sheet metal plates including a body portion, an extension portion extending from the body portion at a longitudinal end of the body portion and generally overlapping the extension portion of the other sheet metal plate, an inner surface and an outer surface, the sheet metal plates being pivotally attached by way of an opening in the extension portion of the first sheet metal plate and pivotable with respect to each other about an axis generally perpendicular to the inner and outer surfaces and extending generally through the center of the opening;
connection formations on each of the first and second sheet metal plates for attaching the plate to a respective one of the structural members so that the structural member pivots conjointly with the sheet metal plate;
a first elongate rib formed into the first sheet metal plate, the elongate rib having first and second terminal ends spaced apart from each other, at least a portion of the first rib being disposed in the extension portion of the first sheet metal plate; and
a second elongate rib formed into the second sheet metal plate, the elongate rib having first and second terminal ends spaced apart from each other, at least a portion of the second rib being disposed in the extension portion of the second sheet metal plate, wherein the extension portion of the first sheet metal plate overlies at least a portion of the second elongate rib.

17. A hinged connector as set forth in claim 16 further comprising:
locator tabs struck from the first sheet metal plate and extending outwardly from the inner surface of the first sheet metal plate for positioning the truss members relative to each other; and
slots formed in the first sheet metal plate by striking the locator tabs from the plate, the slots having first and second ends, each locator tab being disposed at the first end of a respective one of the slots, the locator tab and first end of the slot being nearer to the opening in the first sheet metal plate than the second end of the slot.

18. A hinged connector as set forth in claim 17 wherein the slots extend lengthwise of the first sheet metal plate.

19. A hinged connector as set forth in claim 18 further comprising a second rib formed in the first sheet metal plate, wherein the locator tabs are struck from the ribs.

20. A truss adapted to collapse for transport and to be erected at a building site comprising:
interconnected truss members including first and second truss members pivotally connected to other of the truss members for pivoting movement of the truss members between a collapsed position in which the truss is compacted for transportation and an erect position in which the truss is expanded for installation into a structure; and
a hinged connector interconnecting the first and second truss members, the hinged connector comprising:
a first sheet metal plate and a second sheet metal plate pivotally attached to the first sheet metal plate, each of the sheet metal plates including a body portion, an extension portion extending from the body portion and generally overlapping the extension portion of the other sheet metal plate, an inner surface and an outer surface, the plates being pivotable with respect to each other about an axis generally perpendicular to the inner and outer surfaces;
connection formations on each of the first and second sheet metal plates for attaching the plate to a respective one of the structural members so that the structural member pivots conjointly with the sheet metal plate, wherein the extension portions of the first and second sheet metal plates are free from connection formations;
an elongate rib formed into the first sheet metal plate, at least a portion of the rib being disposed in the extension portion of the first sheet metal plate, wherein no portion of the rib extends around the connection formations on the first sheet metal plate; and
an elongate rib formed into the second sheet metal plate, at least a portion of the second rib being disposed in the extension portion of the second sheet metal plate, wherein the extension portion of the first sheet metal plate overlies at least a portion of the second elongate rib.

* * * * *